US006892069B1

United States Patent
Flynn

(10) Patent No.: US 6,892,069 B1
(45) Date of Patent: May 10, 2005

(54) PROXY ROUTING

(75) Inventor: Jason Stuart Flynn, Suffolk (GB)

(73) Assignee: British Telecommunications, PLC, London (GB)

( * ) Notice: Subject to any disclaimer, the term of this patent is extended or adjusted under 35 U.S.C. 154(b) by 0 days.

(21) Appl. No.: 09/555,917

(22) PCT Filed: Dec. 11, 1998

(86) PCT No.: PCT/GB98/03718

§ 371 (c)(1),
(2), (4) Date: Jun. 6, 2000

(87) PCT Pub. No.: WO99/31846

PCT Pub. Date: Jun. 24, 1999

(30) Foreign Application Priority Data

Dec. 17, 1997 (EP) .............................. 97310244
Dec. 17, 1997 (GB) .............................. 9726647

(51) Int. Cl.[7] .............................................. H04L 12/56
(52) U.S. Cl. ................... 455/432.1; 455/433; 455/428; 455/445; 455/560; 370/405; 370/406
(58) Field of Search ........................ 455/432.1, 67.1, 455/560, 417, 445, 414, 433, 33.2, 89, 432.2, 428; 370/86, 89, 94, 94.1, 94.3, 85.13, 95.11, 401, 201; 395/200.09; 704/228

(56) References Cited

U.S. PATENT DOCUMENTS 4,855,995 A  *  8/1989  Hiyama et al. ............ 370/460
5,325,362 A  *  6/1994  Aziz ........................ 370/405
5,583,862 A  * 12/1996  Callon ...................... 370/397
5,680,548 A  * 10/1997  Trugman .................... 709/226
5,862,481 A  *  1/1999  Kulkarni et al. ......... 455/432.2
6,058,303 A  *  5/2000  .ANG.strom et al. ....... 455/413
6,061,650 A  *  5/2000  Malkin et al. ............. 704/228
6,134,433 A  * 10/2000  Joong et al. ............... 455/417

FOREIGN PATENT DOCUMENTS

| DE | 19618535 A1 | 7/1997 |
| EP | 0637801 A1 | 3/1995 |
| EP | 0748096 A2 | 12/1996 |
| WO | WO 96/21984 | 7/1996 |
| WO | WO 98/26621 | 6/1998 |

* cited by examiner

Primary Examiner—David Hudspeth
Assistant Examiner—Kamran Afshar
(74) Attorney, Agent, or Firm—Nixon & Vanderhye

(57) ABSTRACT

A method of routing messages destined for a mobile node (6) in a communications system, such as the Internet, including sending the messages to a proxy node (18) according to reachability information recording the current reachability of the mobile node (6), as well as user preference information provided by a service controller (13), which is able to divert an incoming message to an address specified by the user, and in the absence of current location information for the mobile node (6), can intervene to send an incoming message to a default location such as the proxy node (18).

12 Claims, 2 Drawing Sheets

PROXY ROUTING

RELATED APPLICATIONS

This application is related to my copending applications:
(1) Ser. No. 09/555,740, filed Jun. 5, 2000 entitled "MOBILE DATA ROUTING"
(2) Ser. No. 09/582,728 entitled "COMMUNICATIONS SYSTEMS"

BACKGROUND OF THE INVENTION

1. Field of the Invention

The present invention relates to the routing of data within communications networks, including but not confined to networks such as the Internet and particularly, but not exclusively, to a method of routing data directed to a mobile node. The mobile node may be a mobile host, such as a portable computer, or it may be a router which is responsible for the mobility of one or more entire networks, for example, the mobile data network within an aircraft. In either case, the mobile node may change its point of attachment from one network or subnetwork to another.

2. Background

The routing of data around the diverse networks which make up the Internet is based on a protocol known as the Internet Protocol (IP). Data is transferred in the form of data units known as IP datagrams between points in the Internet specified by IP addresses. The detailed specification of IP is available in a "Request for Comments" document, RFC 791, maintained by the Internet Engineering Task Force (IETF). RFC documents are widely available on the Internet at, for example, "ftp://ds.internic.net/rfc/rfcxxxx.txt", where "xxxx" represents the RFC number, so that RFC 791 is available as rfc791.txt.

The current version of IP, known as IPv4, does not itself support mobility, but a protocol entitled "IP Mobility Support", commonly referred to as Mobile IP, has been designed to enhance IPv4 to support mobility. This protocol is described in document RFC 2002, available as detailed above. The next generation of IP (IPv6) is being specifically designed to deal with the mobility requirement.

IPv4 assumes that a node's IP address uniquely identifies the node's fixed point of attachment to the Internet. If the node is transferred to a different point, it can only be contacted by allocating it a new IP address. Mobile IP, however, enables a mobile node, such as a laptop or palmtop computer, to send and receive IP datagrams over the Internet regardless of the physical location at which it is connected to the Internet and without changing its IP address. One example of the mechanism by which it does so is illustrated in FIGS. 1a and 1b.

Referring to FIG. 1a, the Internet comprises a large number of networks and sub-networks 1, 2, 3, 4 connected via routers 5. A router may be a general purpose computer programmed to perform routing tasks. Increasingly, routers throughout the Internet are dedicated pieces of hardware provided by companies such as Cisco Systems, California, USA. In either case, the functionality of a router intended for use in an IP based network is defined in RFC 1812.

A mobile node (MN) 6 is normally connected to the Internet via a home network 1. The unique IP address assigned to the node 6 is known as its home address. Mobility agents, known as foreign agents (FA) and home agents (HA), advertise their presence on a network via availability messages known as Agent Advertisements. A mobility agent is typically a router connected to a particular network; for example, a home agent 7 is a router connected to the home network 1 and a foreign agent 8 is a router connected to a foreign network 2. The mobile node 6 may optionally solicit an Agent Advertisement message from any local mobility agents via an Agent Solicitation message. By receiving Agent Advertisements, the mobile node 6 is able to determine whether it is on its home network 1 or on a foreign network 2, 3, 4.

While the mobile node 6 is on its home network, it has no need for mobility services. When the mobile node 6 is temporarily moved to a foreign network 2, as shown by the dotted box in FIG. 1a, it obtains a temporary care-of address on the foreign network 2. This can be a foreign agent care-of address, which is the IP address of the foreign agent, obtained by receiving or soliciting Agent Advertisements from any foreign agents based on the foreign network 2. Alternatively, the care-of address may be obtained by using an external assignment mechanism, such as Dynamic Host Configuration Protocol (DHCP) (the reader is referred to RFC 1541 for further information), in which case it is known as a co-located care-of address.

The mobile node 6 then registers its new care-of address with its home agent 7 by exchanging Registration Request and Registration Reply messages with it. Registration provides a mechanism by which mobile nodes can communicate their current reachability information to their home agent. The registration process is described in more detail below, assuming that the mobile node 6 on the foreign network 2 is registering a foreign agent care-of address received via an Agent Advertisement from, for example, foreign agent 8.

First, the mobile node 6 sends a Registration Request message to the foreign agent 8, which processes it and forwards it to the mobile node's home agent 7. The Registration Request message includes the IP address of the foreign agent. The home agent 7 sends a Registration Reply message to the foreign agent 8 granting (or denying) the registration request. The foreign agent 8 processes this Reply and forwards it to the mobile node 6. This process establishes a temporary address for the mobile node 6 to which datagrams can be delivered while the node is roaming away from its home network 1.

If the mobile node 6 is returning to its home network 1 having been on a foreign network 2, it deregisters with its home agent 7, through exchange of Registration Request and Registration Reply messages.

Referring to FIG. 1b, when a correspondent node (CN) 9 attached to a network 4 sends a message intended for the mobile node 6, while it is connected to the foreign network 2, the message is intercepted by the home agent 7, as shown by arrow A. The home agent 7 encapsulates the datagrams forming the message with the care-of address for the mobile node 6, in this example being the IP address of the foreign agent 8, and forwards the message to the foreign agent 8.

The transmission of the encapsulated datagrams, shown by arrow B, is known as tunnelling. The foreign agent 8 receives the datagrams, decapsulates them and forwards them to the mobile node 6, as shown by arrow C. Messages from the mobile node 6 to other nodes in the Internet need not follow this route, but may be sent directly via an appropriate router, which may be foreign agent 8.

The concepts of encapsulation and tunnelling are described in detail in RFC 2003, "IP Encapsulation within IP". The model is that a tunnel is the path followed by a datagram while encapsulated. Encapsulation allows an IP datagram to be hidden from intermediate routers which would incorrectly attempt to route it to the mobile node. Instead, the datagram is routed between the encapsulator and a knowledgeable decapsulator, such as a foreign agent, which can correctly route the datagram. The home agent 7 and foreign agent 8 are known as the endpoints of the tunnel. In the case of the co-located care-of address, the mobile node itself acts as an endpoint of the tunnel.

U.S. Pat. No. 5,325,362 (Aziz) and Johnson D B: "Ubiquitous Mobile Host Internetworking", Proceedings of the workshop on workstation operating systems, 14 Oct. 1993, pp. 85–90, XP000672247, disclose tunnelling schemes which enable efficient routing of data to a mobile node to be maintained when the mobile node moves between its home network and foreign networks.

To enable the tunnelling process described above to function correctly, the home agent 7 maintains reachability information for the mobile node 6, in a form known as a mobility binding. This is the association of the mobile node's identity with a care-of address and a parameter known as the Lifetime, which is the number of seconds remaining before the registration of the node 6 with the home agent 7 expires. The aim behind a Lifetime value is to maintain the dynamic nature of the system, with a binding expiring within a set time unless positively maintained by the mobile node 6. As an example, the default Router Advertisement Lifetime value, which may be used where a mobile node is registering with a foreign agent which it has acquired via an Agent Advertisement, is 1800 seconds.

On receipt of a Registration Request message, the home agent 7 creates or modifies the mobility binding, for example, by re-setting the Lifetime value where the Request is a re-registration request and the mobility binding has not yet expired. If the Lifetime value for a given mobility binding expires before a re-registration request has been received, the home agent 7 deletes the mobility binding from its record. The Registration-Reply message from the home agent 7 informs the mobile node 6 (via the foreign agent 8) of the status of its Request, including the Lifetime value allocated by the home agent 7.

Mobile IP supports multiple simultaneous mobility bindings, so that each mobile node 6 may register with a number of foreign agents and so obtain a number of care-of addresses. This is particularly useful where a mobile node using a wireless interface to a network, for example an RF interface, moves within range of more than one foreign agent. For example, if the mobile node is a router on an aircraft, then while the aircraft is in flight, the router may from time to time register with a series of foreign agents based on the ground below using a radio link.

In the case of multiple simultaneous mobility bindings, the home agent 7 retains its existing list of mobility bindings when it receives a Registration Request containing the IP address of a new foreign agent. If the Lifetime value of one mobility binding expires, the home agent 7 deletes that mobility binding from its record, but retains in its record the other non-expired bindings.

FIG. 2 shows a situation in which the mobile node 6 is within range of two foreign agents 10, 11. Once the registration process with each foreign agent 10, 11 is complete, Mobile IP provides for the home agent 7 to tunnel a separate copy of each arriving datagram to each care-of address. The mobile node 6 will therefore receive multiple copies of each datagram depending on the number of foreign agents with which it is registered, in this case, two. This improves the bit error rate of the transmission.

The very nature of a mobile communications system means that links may be being constantly established, broken and re-established. The home agent 7 may lose contact with the mobile node 6 through one foreign agent, only to have it re-established through another foreign agent. However, the home agent 7 may lose contact with the mobile node 6 entirely, so that the Lifetime of each of its mobility bindings will eventually expire. When this occurs, the home agent 7 deletes each mobility binding, when it expires, from its record for that mobile node 6. Once all the mobility bindings have expired, the mobile node is no longer reachable through the home agent 7. Data sent to the mobile node 6 cannot therefore be routed to its destination. This type of event is dealt with by a protocol known as the Internet Control Message Protocol (ICMP), which is an integral part of all IP implementations. The functions of ICMP include dealing with error reporting and reachability testing as well as performance measurement and congestion control. In the event that the home agent 7 has no mobility bindings specifying a route to the mobile node 6, the home agent 7 generates an ICMP Destination Unreachable error report and sends this to the correspondent node 9 with a code indicating that the destination network is unreachable.

It is also possible for the home agent 7 to be unaware that the mobile node 6 is no longer reachable, for instance because the node becomes unreachable soon after re-registering its presence with the home agent 7, so that the Lifetime of the corresponding mobility binding has not yet expired. In this case, the home agent 7 will continue sending encapsulated datagrams through the tunnel, but the foreign agents 10, 11 will be unable to relay these to the mobile node. ICMP error messages will therefore be generated which will be relayed to the correspondent node 9 as before.

Although ICMP is useful in providing some indication of communication difficulties, it does not resolve the problem of ensuring that data reaches its destination, but simply notifies the existence of a problem. Further, there are times when the mobile node 6 itself knows that it will be unreachable at its present location and requires some method of call forwarding. It is further inconvenient if, after becoming unreachable, the mobile node 6 subsequently becomes contactable again and re-registers with the home agent 7, but the data destined for it is no longer available.

SUMMARY OF THE INVENTION

To address the above problems, the present invention provides a method of routing data directed to a mobile node in a communications system, comprising the steps of maintaining reachability information for the mobile node and is receiving data directed to the mobile node, characterised by setting a destination to which the received data is to be sent when the reachability information indicates that the mobile node is unreachable.

The data destination may comprise a proxy node and the method may further comprise instructing the proxy node to send received data to the mobile node when the reachability information indicates that the mobile node has become reachable.

The data destination may be set in accordance with a user preference, which may also specify the conditions in which the user specified destination is to be used. Advantageously therefore, the user may control the circumstances in which a proxy destination is used, while the system can be arranged so that if the user does not specify a default destination, such a destination is always provided when the mobile node is not reachable from the home agent.

The reachability information may be a single destination address or a plurality of addresses, such as the care-of addresses provided by a plurality of foreign agents in a mobile IP based system.

The invention further provides a mobile communications system comprising a mobile node, means for maintaining reachability information for the mobile node and means for receiving messages directed to the mobile node, characterised by a service controller configured to set a destination for a message directed to the mobile node when the reachability information indicates that the mobile node is unreachable.

According to the invention, there is further provided a method of routing data directed to a mobile host which is away from its home network, comprising the steps of maintaining a record of locations through which the data can be routed to the mobile host, and in the event that the data cannot be routed to the mobile host through any of the locations specified in the record, then routing the data to an alternative destination from which it is available for subsequent retrieval to the mobile host.

In accordance with the invention, there is also provided a mobile communications system comprising a mobile host movable between its home network and a plurality of connected communications networks, a router configured to route data intended for the mobile host to a location through which the data can be sent to the mobile host, when the mobile host is away from its home network, and a service controller configured to intervene so as to send the data to an alternative location, when the data cannot be sent to the mobile host.

The invention also provides a mobile communications system comprising a mobile node and means for receiving a message directed to the mobile node, characterised by means for controlling the destination to which the message is to be sent in accordance with a user preference.

The system can further comprise means for maintaining reachability information for the mobile node, and the controlling means can be operative to set a user defined destination for the message when the reachability information indicates that the node is unreachable.

The invention further provides a method of routing data directed to a mobile node in a communications system, comprising the steps of receiving data directed to the mobile node, and setting the destination to which the data is to be sent in accordance with a user preference.

BRIEF DESCRIPTION OF THE DRAWINGS

Embodiments of the invention will now be described by way of example with reference to the accompanying drawings, in which:

FIG. 1b shows the flow of data to a mobile node attached to a foreign network in the system of FIG. 1a;

DETAILED DESCRIPTION

Figure 1A:
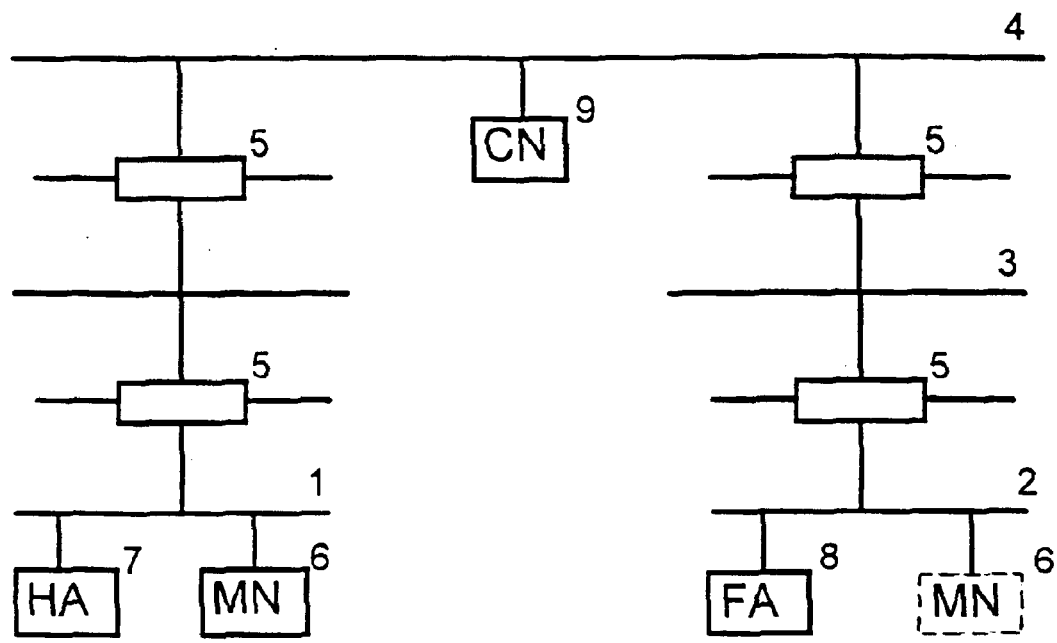
FIG. 1a is a schematic diagram of the general arrangement of a conventional mobile IP based system.
Figure 1B:
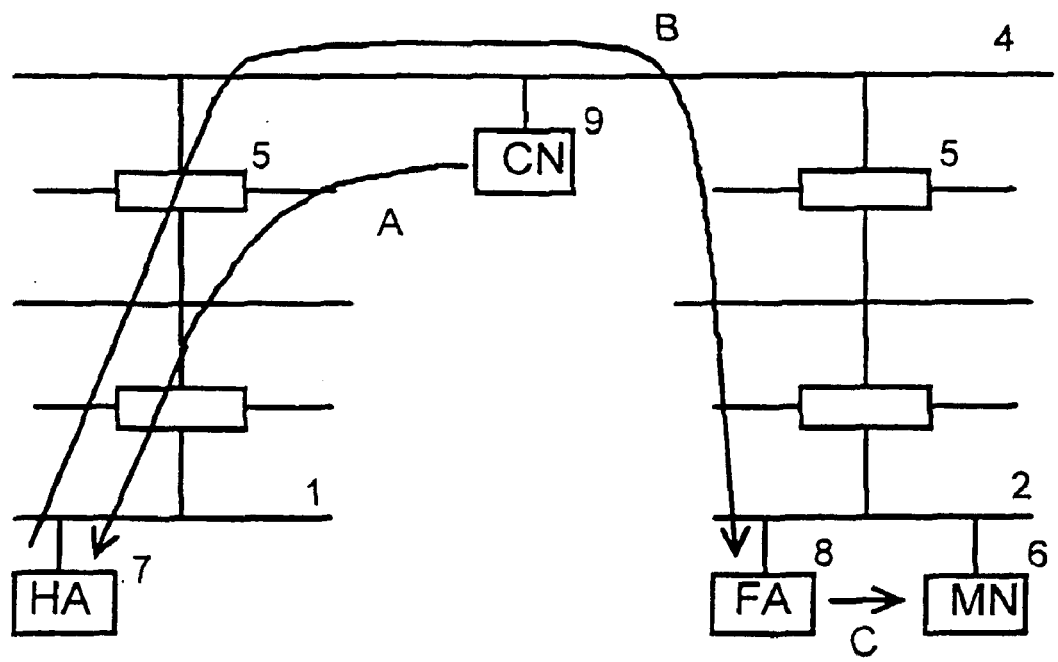
Figure 2:
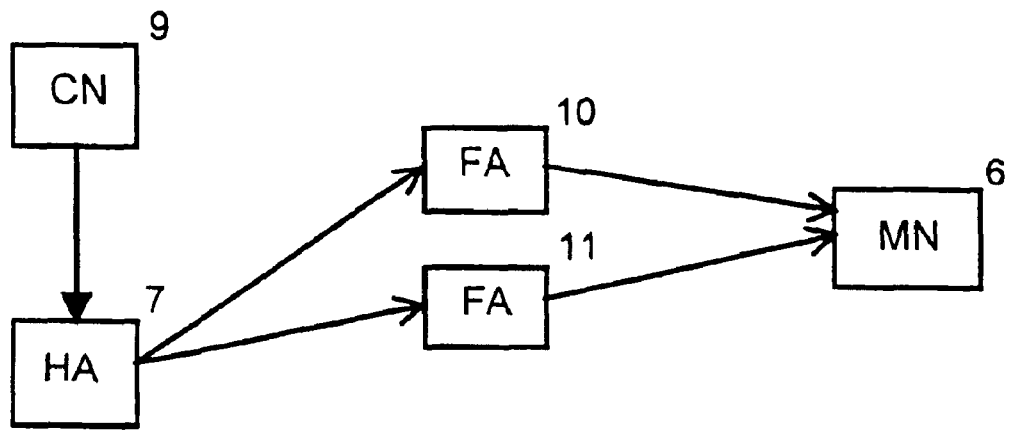
FIG. 2 is a schematic block diagram showing the registration of a mobile node with multiple foreign agents in a conventional mobile IP based system.

Referring to FIG. 1b, in a known IP based system such as the Internet, the home agent 7 plays a passive role in data transmission to the mobile node 6. When the home agent 7 intercepts a data message destined for the mobile node 6, its only options are to tunnel the message to the mobile node 6 based on its record of the current location of that node, or, if it has no reachability information, to return an ICMP error.

Figure 3:
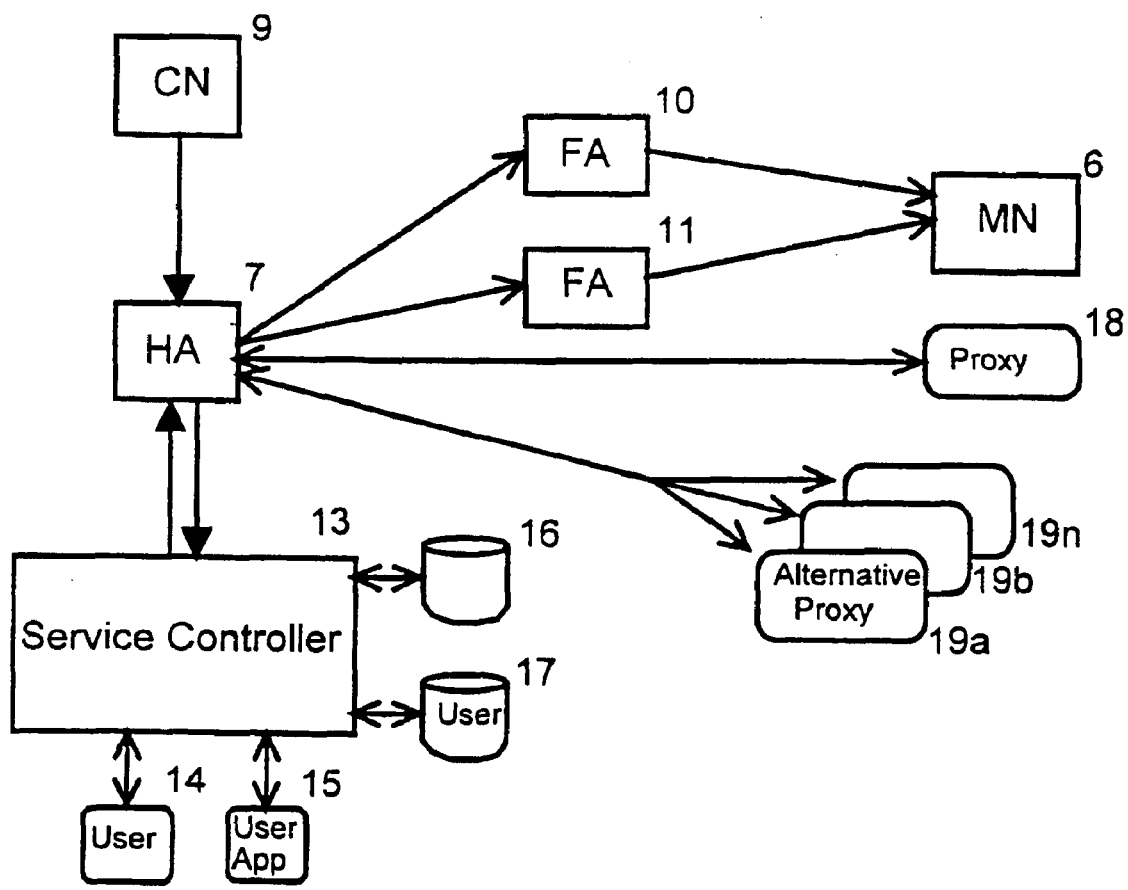
FIG. 3 is a schematic block diagram of a system according to the present invention for use with the method according to the present invention.

Referring to FIG. 3, in a system according to the invention, the home agent 7, for example a PC running software which provides routing functionality, is re-configured so that before any datagrams are tunnelled to the foreign agents 10, 11, a service controller 13 can intervene. The functions of the service controller 13 as defined below can be readily implemented in software on a general purpose computer. The service controller 13 comprises a user interface 14 as well as processing capability to execute user applications 15. It also provides data storage in the form of a temporary store 16 and a user preferences database 17. The principal function of the service controller 13 is to determine appropriate mobility bindings for the home agent 7 based on current binding information from the home agent, together with user or system defined preferences.

Where the mobile node 6 is reachable from the home agent 7, the service controller may intervene to set new mobility bindings, where the user preferences specify that it should do so.

In the event that the mobile node 6 is not reachable from the home agent 7, the service controller 13 can be instructed always to intervene, so that incoming data is always sent to an appropriate destination. This may be, for example, the temporary store 16, but, in a preferred embodiment of the invention, the appropriate destination is a proxy node 18, which can store data destined for the mobile node 6 when the mobile node is unavailable, and effectively takes the place of the correspondent node 9 when the mobile node 6 subsequently becomes available on the network.

A preferred destination, for use either in particular circumstances, or as a general default destination, may be specified by a user through the user interface 14, or by a user application 15 running on the service controller 13. If no preferred destination is specified by the user, the system administrator may in any case set up a default destination, for example the proxy node 18.

Preferences requested by a user may be stored in the user preferences database 17. The preference may indicate an alternative destination, such as one of a plurality of alternative proxy nodes 19a–n, for any messages addressed to the mobile node 6 and may also contain codes specifying the circumstances in which the alternative destination is to be used. For example, the database 17 may specify that the alternative destination is only to be used at or after a particular date or time. The database 17 may further contain multiple destination addresses, each to be used in different circumstances. For example, different destinations may be used in different time periods or in response to different types of message, so that file transfers may be routed to one destination, proxy node 19a say, while video calls are routed to another, such as proxy node 19b.

The above examples are not intended to be limiting, since the database 17 may store any data format so as to allow the service controller 13 to be configured to provide intelligent network services in line with the requirements of any particular system with which the service controller 13 is used.

The operation of the system is described below with reference to FIG. 3.

When a message, in the form of a stream of datagrams, is received from a correspondent node 9 destined for the mobile node 6, the home agent 7 checks its internal record for unexpired mobility bindings for that node.

If the home agent's record reveals no mobility bindings recorded for the mobile node 6, the home agent 7 signals the service controller 13. The service controller 13 then examines the user preferences database 17 and provides the home agent 7 with a default binding which is active only when there are no other bindings. If no user preference is supplied, the service controller 13 uses the default provided by the system administrator.

While the mobile node 6 is unavailable, and so the default binding is active, any message intended for the mobile node 6 will be tunnelled to the preferred destination, for example, the proxy node 18. The proxy node 18 decapsulates the message and stores it. When the home agent 7 receives a message from the correspondent node 9, the service controller 13 may also instruct the home agent 7 to send back a message, for example, a previously stored user message, to the correspondent node 9.

At some time after the message from the correspondent node 9 is sent, the mobile node 6 becomes available again, either on its home network 1, in which case it deregisters with the home agent 7, or on a foreign network 2, 3, 4, in which case it re-registers a new care-of address with the home agent 7. In either case, the home agent 7 updates the service controller 13, which instructs the proxy node 18 to send the stored message to the mobile node 6. As far as the mobile node 6 is concerned, the proxy node 18 therefore takes the place of the correspondent node 9 and sends the stored message to the mobile node 6 in accordance with the conventional Mobile IP protocol. For example, if the mobile node 6 has returned to its home network 1, then the proxy node 18 sends the message directly to the mobile node 6, ignoring the home agent 7. If, on the other hand, the mobile node 6 is on a foreign network 2, 3, 4 and registered with the home agent 7, the proxy node 18 sends the message to the home agent 7 for onward transmission to the mobile node 6 through the appropriate care-of address.

To deal with the possibility that the home agent 7 is unaware that the mobile node 6 is no longer reachable, for instance because the node becomes unreachable soon after re-registering its presence with the home agent 7, the foreign agents 10, 11 are configured to send back all ICMP error messages to the home agent 7, so that the home agent 7 can modify the bindings. This ensures that such error messages are not sent back to the correspondent node 9, so that, as far as the correspondent node 9 is concerned, the mobile node 6 is available to it, and the message will be routed in accordance with the settings specified at the service controller 13.

Where the home agent's record contains unexpired mobility bindings in respect of at least one of the foreign agents 10, 11, the home agent 7 then requests the service controller 13 to check whether a user preference is recorded in the user preferences database 17. As described above, the user database 17 also records information indicating the circumstances in which the user preference is to be used. If no user preference is indicated, or if the conditions or circumstances of use are not satisfied, the home agent 7 sends the message to the mobile node 6 via the appropriate foreign agents 10, 11. If an active user preference is found, the service controller 13 acts in accordance with that preference to amend the home agent's mobility bindings. For example, the preference may specify that, despite the mobile node 6 being reachable, messages should be sent to proxy node 19a during some predetermined period. The service controller 13 therefore amends the home agent's mobility bindings at the appropriate times so as to put the preference into effect. At the expiry of the predetermined period, the service controller 13 instructs the proxy node 19a to send the stored message to the mobile node 6 in accordance with the conventional Mobile IP protocol, as described above.

The system described above is capable of working with real-time telecommunications services such as video calls, enabling on-the-fly redirection of such services to a mobile node via a proxy node when the mobile node is unavailable.

Although the above examples have been described with reference to the internet, the invention is applicable to any network based on the Internet Protocol and the principles may be extended to systems based on other network protocols.

What is claimed is:

1. A method of routing data directed to a mobile node in a communications system, comprising:
   maintaining reachability information for the mobile node;
   sending data to the mobile node when the reachability information for the mobile node indicates that the mobile node is reachable;
   setting an alternative destination to which data is to be sent when the reachability information indicates that the mobile node to which the data is directed is unreachable, said alternative destination comprising a proxy node;
   storing the data at said proxy node; and
   forwarding data stored in the proxy node to the mobile node when the reachability information indicates that the mobile node is reachable.

2. A method according to claim 1, comprising setting the data destination in accordance with a user preference.

3. A method according to claim 2, wherein the user preference specifies the conditions in which the user specified destination is to be used.

4. A method according to claim 1, wherein the reachability information comprises at least one destination address.

5. A method according to claim 1, wherein the communications system comprises an Internet Protocol (IP) based system.

6. A method according to claim 5, wherein the reachability information is maintained by a home agent router.

7. A method according to claim 5, wherein the destination address is a care-of address for the mobile node.

8. A mobile communications system comprising:
   a mobile node;
   means for maintaining reachability information for the mobile node;
   means for receiving messages directed to the mobile node;
   a service controller configured to set a destination, to which messages directed to the mobile node are to be forwarded when the reachability information indicates that the mobile node is unreachable, said destination comprising a proxy node for storing said data; and
   means for forwarding data stored in the proxy node to the mobile node when the reachability information indicates that the mobile node is reachable.

9. A method of routing data directed to a mobile host which is away from its home network, comprising:
   maintaining a record of locations through which the data can be routed to the mobile host, and in the event that the data cannot be routed to the mobile host through any of the locations specified in the record, then routing the data to a proxy from which it is available for subsequent retrieval and forwarding to the mobile host when the data can be routed to the mobile host.

10. A method according to claim 9, further comprising storing the data at said alternative destination until the mobile host becomes available.

11. A mobile communications system comprising:
- a mobile host movable between its home network and a plurality of connected communications networks;
- a router configured to route data intended for the mobile host to a location through which the data can be sent to the mobile host, when the mobile host is away from its home network; and
- a service controller configured to intervene so as to send the data to proxy location, when the data cannot be sent to the mobile host, and sending the data from the proxy location to the mobile host when the mobile host becomes available.

12. A method of routing data directed to a mobile node in a communications system, comprising:
- maintaining reachability information for the mobile node; and
- setting a proxy destination to which data is to be sent from a sender of the data and stored only when the reachability information indicates that the mobile node is unreachable, said proxy destination being a destination other than the unreachable mobile node, and sending the data stored in the proxy destination to the mobile node when the reachability information indicates that the mobile node is reachable.

* * * * *